US010222207B2

(12) United States Patent
Polidor et al.

(10) Patent No.: US 10,222,207 B2
(45) Date of Patent: Mar. 5, 2019

(54) ARTICULATED HEAD WITH MULTIPLE SENSORS FOR MEASURING MACHINE

(71) Applicant: Quality Vision International, Inc., Rochester, NY (US)

(72) Inventors: Edward T. Polidor, Webster, NY (US); Kenneth L. Sheehan, Ontario, NY (US); Joseph C. LaPlaca, Rochester, NY (US)

(73) Assignee: Quality Vision International, Inc., Rochester, NY (US)

(*) Notice: Subject to any disclaimer, the term of this patent is extended or adjusted under 35 U.S.C. 154(b) by 0 days.

(21) Appl. No.: 15/700,100

(22) Filed: Sep. 9, 2017

(65) Prior Publication Data
US 2018/0073871 A1 Mar. 15, 2018

Related U.S. Application Data (60) Provisional application No. 62/385,754, filed on Sep. 9, 2016.

(51) Int. Cl.
*G01N 21/00* (2006.01)
*G01B 21/20* (2006.01)
*G01B 5/008* (2006.01)
*G01B 11/22* (2006.01)
*G01B 5/012* (2006.01)
*G01B 11/00* (2006.01)

(52) U.S. Cl.
CPC ............ *G01B 21/20* (2013.01); *G01B 5/008* (2013.01); *G01B 5/012* (2013.01); *G01B 11/007* (2013.01); *G01B 11/22* (2013.01)

(58) Field of Classification Search
CPC ... H01J 37/32935; G01N 21/64; G01N 21/68; G01N 2015/1037; G01J 3/02
USPC .......................................................... 356/72
See application file for complete search history.

(56) References Cited

U.S. PATENT DOCUMENTS

| 4,908,951 | A | | 3/1990 | Gurny | |
|---|---|---|---|---|---|
| 5,052,379 | A | * | 10/1991 | Airy | ...................... A61F 5/0125 482/112 |
| 2013/0027544 | A1 | | 1/2013 | Chang | |
| 2017/0268544 | A1 | | 9/2017 | Singh et al. | |

FOREIGN PATENT DOCUMENTS

| DE | 19747027 A1 | | 10/1998 | | |
|---|---|---|---|---|---|
| EP | 2749840 A1 | | 2/2014 | | |
| EP | 2749840 A1 | * | 7/2014 | ............... | G01B 5/20 |

OTHER PUBLICATIONS

International Search Report and Written Opinion of the International Searching Authority (PCT/US2017/050856) dated Nov. 2, 2017.

* cited by examiner

*Primary Examiner* — Md M Rahman
(74) *Attorney, Agent, or Firm* — Thomas B. Ryan, Patent Agent; Harter Secrest & Emery LLP (57) ABSTRACT

An articulated sensor head includes three different sensor modules. A first of the sensor modules is carried on an extended shank that is mounted in a pivotable fashion from an articulating wrist. A housing carrying a second and a third of the sensor modules is releasably fastened to the extended shank. The second and third sensor modules are carried by the housing in a fixed angular orientation with respect to an orientation of the first sensor module.

11 Claims, 9 Drawing Sheets

FIG. 9

ARTICULATED HEAD WITH MULTIPLE SENSORS FOR MEASURING MACHINE

TECHNICAL FIELD

The invention relates to articulated sensor heads and sensor measuring systems of coordinate measuring machines.

BACKGROUND OF THE INVENTION

Articulated sensor heads provide for varying the orientation of sensors, particularly probes, for accessing features in different forms and orientations on workpieces or other test objects. While coordinate measuring machines typically include multiple axes for relatively moving a probe or other form of sensor with respect to a test object under measurement, articulated sensor heads generally provide one or more rotational axes that can quickly and efficiently adjust the orientation of probes or other sensor types for accommodating different features and their orientations on test objects.

Differently configured probes and other sensors having different sizes, sensitivities, or types of data acquisition are often needed to more precisely or comprehensively measure test objects with different types and arrangements of surfaces. As such, articulated sensor heads are often adapted to use interchangeable probes or other sensors. In addition to the possibility for manually exchanging probes or other sensors, automated exchange systems store the alternative probes or other sensors in docking stations and the sensor heads can be moved out of their measuring positions to and from the docking stations to exchange probes or sensors when needed. However, even the automated exchange systems consume valuable measurement time not only through the mechanical acts required to exchange the probes or other sensors but also in one or more of repositioning, reorienting, and recalibrating the replacement probes or other sensors for continuing measurement operations within a common frame of reference. Issues of time consumption and measurement continuity are particularly problematic during exchanges of different sensor types.

SUMMARY OF THE INVENTION

The invention in one or more of its preferred embodiments envisions a more versatile, efficient, and accurate measuring machine made possible by an articulated sensor head arranged for carrying a range of different sensor types in a fixed relative orientation. For example, the articulated sensor head can be arranged to carry a touch probe, together with a depth-sensing laser and a vision sensor having measurement axes in a common angular orientation with respect to each other and in a predetermined angular relationship with a measurement axis of the touch probe.

One embodiment of the invention is based on an articulated sensor head having a first sensor module carried on an extended shank that is mounted in a pivotable fashion from an articulating wrist. A housing carrying second and third sensor modules is fastened to the extended shank. The second and third sensor modules are carried by the housing in a fixed angular orientation with respect to an orientation of the first sensor module.

Preferably, the first, second, and third sensor modules are arranged for collecting information about test objects in different ways. For example, the first sensor module can be part of a touch probe that collects information from relative physical displacements of a stylus with respect to the test object, the second sensor module can be part of a depth-sensing laser that collects information from laser beam reflections from the test object, and the third sensor module can be part of a vision sensor that collects information from camera images taken of the test object. The vision sensor preferably includes a co-axial light source.

Preferably, each of the three sensor modules has a reference measurement position that is calibrated with respect to the reference measurement positions of the other sensor modules by displacements of the articulated sensor head. Thus, the same location on the test object can be measured by each of the three sensor modules by the calibrated displacements of the articulated sensor head. In this regard, each of the three sensor modules includes a measurement axis, and the measurement axes of the second and third sensor modules preferably share a common fixed angular orientation in a predetermined angular relationship with the measurement axis of the first sensor module. More preferably, the measurement axes of all three sensor modules extend in parallel.

To provide further flexibility for measuring different test objects in different ways, the first sensor module is preferably interchangeable with other sensor modules. For example, a first coupling can be provided between the first sensor module and the extended shank, thereby allowing the first sensor module to be exchanged with alternative sensor modules independently of the second and third sensor modules carried in the housing, which is separately attached to the extended shank. One member of the first coupling can be mounted on a free end of the shank, and a mating coupling member can be mounted on the first sensor module and on each of the alternative sensor modules intended to be independently coupled to the shank. The second and third sensor modules can be collectively attached or detached from the shank by attaching the housing to an intermediate portion of the extended shank using a removable clamp or other releasable fastening device including couplings that are located along the extended shank or between the extended shank and the housing. Once the housing is detached, measurements can be taken by the first sensor module alone or a similarly attachable alternative housing carrying one or more different sensor modules can be clamped or otherwise releasably fastened to the intermediate portion of the extended shank for taking additional measurements. A similar coupling within the housing can be arranged to allow the second sensor module to be replaced by a similarly coupleable alternative sensor module independently of the first and third sensor modules. Docking stations can be provided for holding the alternative sensor modules for replacing the first and second sensor modules as well as the alternative housing carrying alternative second or third sensor modules.

An embodiment of the invention as a method of measuring a test object with an articulated sensor head includes measuring a given point on a test object with a first of three sensor modules each having a reference measurement position that is calibrated with respect to the reference measurement positions of the other sensor modules by displacements of the articulated sensor head. The articulated sensor head is displaced by the displacement calibrated between the reference measurement positions of the first sensor module and a second of the three sensor modules. The given point on the test object is measured with the second sensor module at the displaced position of the articulated sensor head.

The articulated sensor head can be further displaced by the displacement calibrated between the reference measurement positions of the second sensor module and a third of the three sensor modules. The given point on the test object can be measured with the third sensor module at the further displaced position of the articulated sensor head. Preferably, the calibrated displacements of the articulated sensor head are carried out by translations of the articulated sensor head.

The measurement method also preferably includes releasably coupling the first of the three sensor modules to an extended shank of the articulated sensor head and releasably coupling a housing carrying the second and third sensor modules to the extended shank. For taking additional measurements, the first sensor module can be replaced with a different sensor module by decoupling the first sensor module from the extended shank and coupling the different sensor module to the extended shank using a portion of a first sensor module coupling that remains on the extended shank. Similarly, the housing carrying the second and third sensor modules can be replaced with a different housing carrying at least one different sensor module by decoupling the housing from the extended shank and coupling the different housing to the extended shank using a portion of a housing coupling that remains on the extended shank.

The third sensor module can be a vision sensor having a variable working distance lens and an adjustable co-axial light source for illuminating the test object at different working distances. As such, the measurement method can include adjusting the working distance of the lens together with adjusting the co-axial light source for illuminating the test object at the adjusted working distance of the lens.

DETAILED DESCRIPTION OF THE INVENTION

Figure 1:
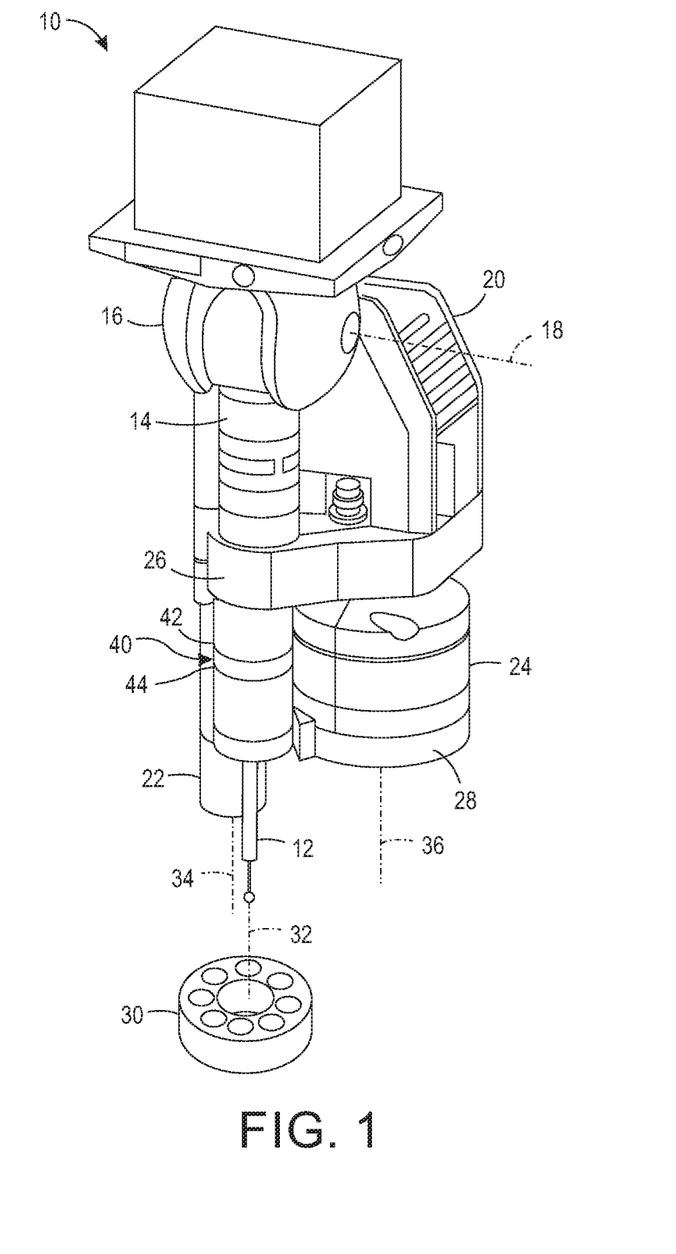
FIG. 1 is a perspective view of an articulated sensor head in accordance with an embodiment of the invention.
Figure 2:
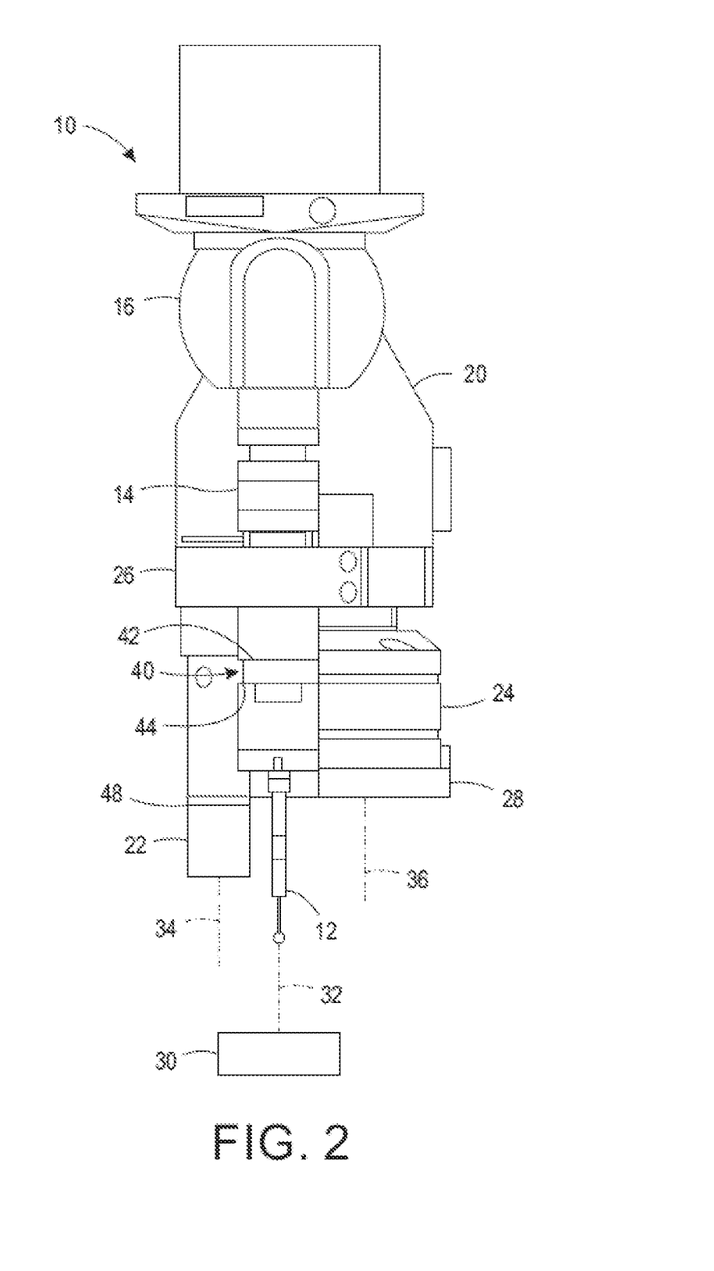
FIG. 2 is a front view of the articulated sensor head of FIG. 1.
Figure 3:
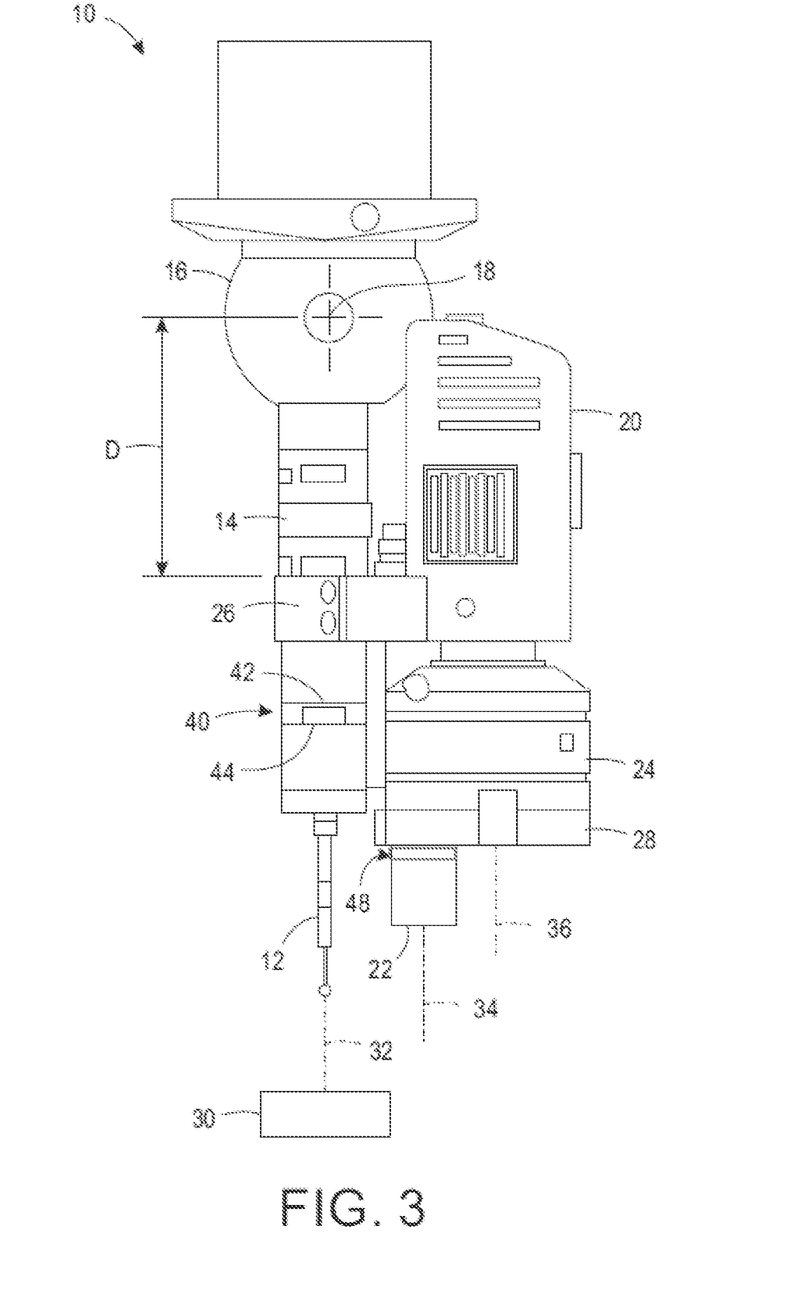
FIG. 3 is a side view of the articulated sensor head of FIG. 1.
Figure 4:
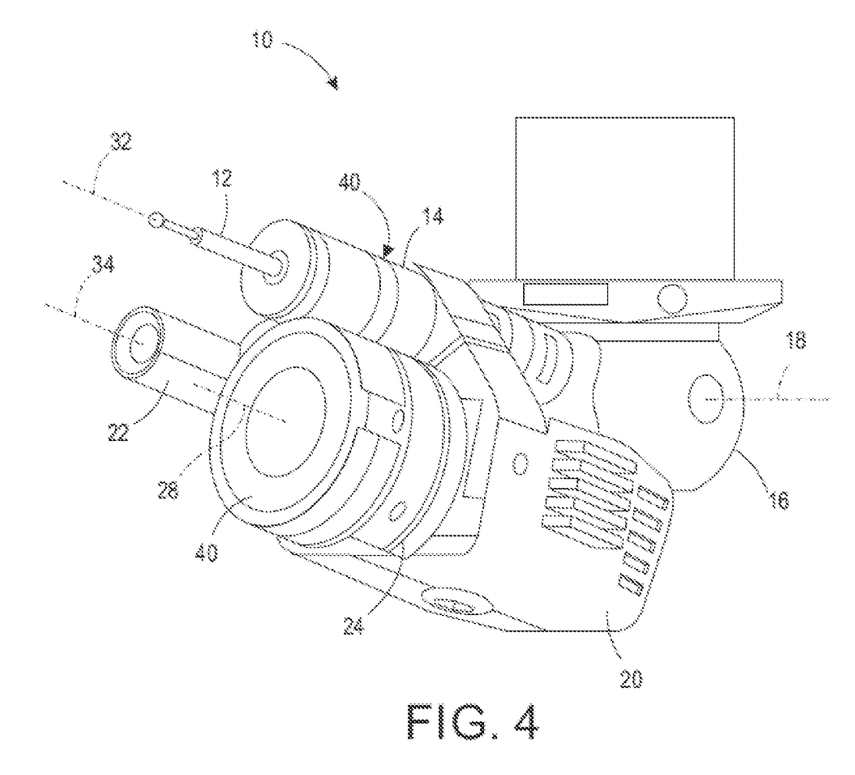
FIG. 4 is another perspective view of the articulated sensor head of FIG. 1 in a fully pivoted position about a pivot axis.
Figure 5:
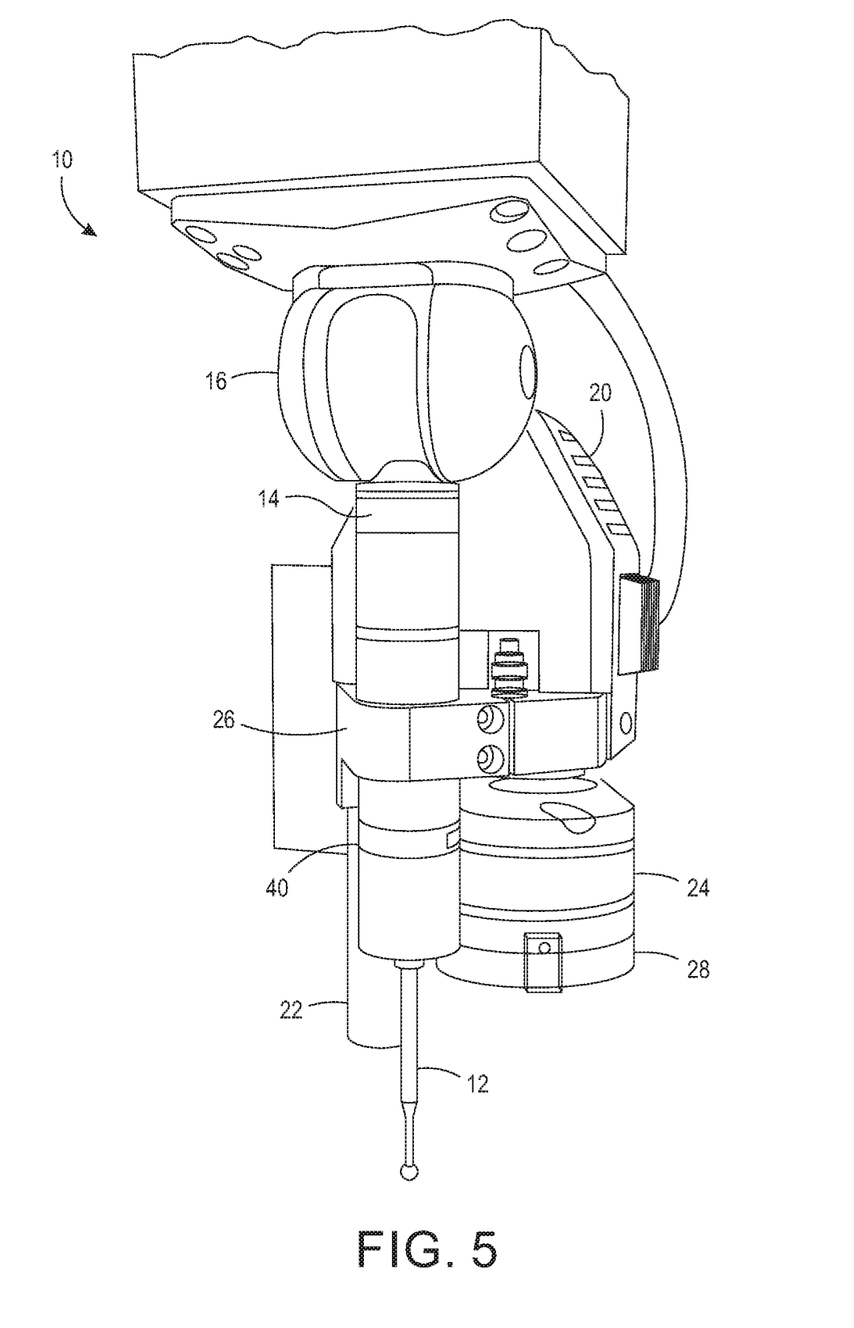
FIG. 5 is a substantially front perspective view of the articulated sensor head of FIG. 1 captured as an image.
Figure 6:
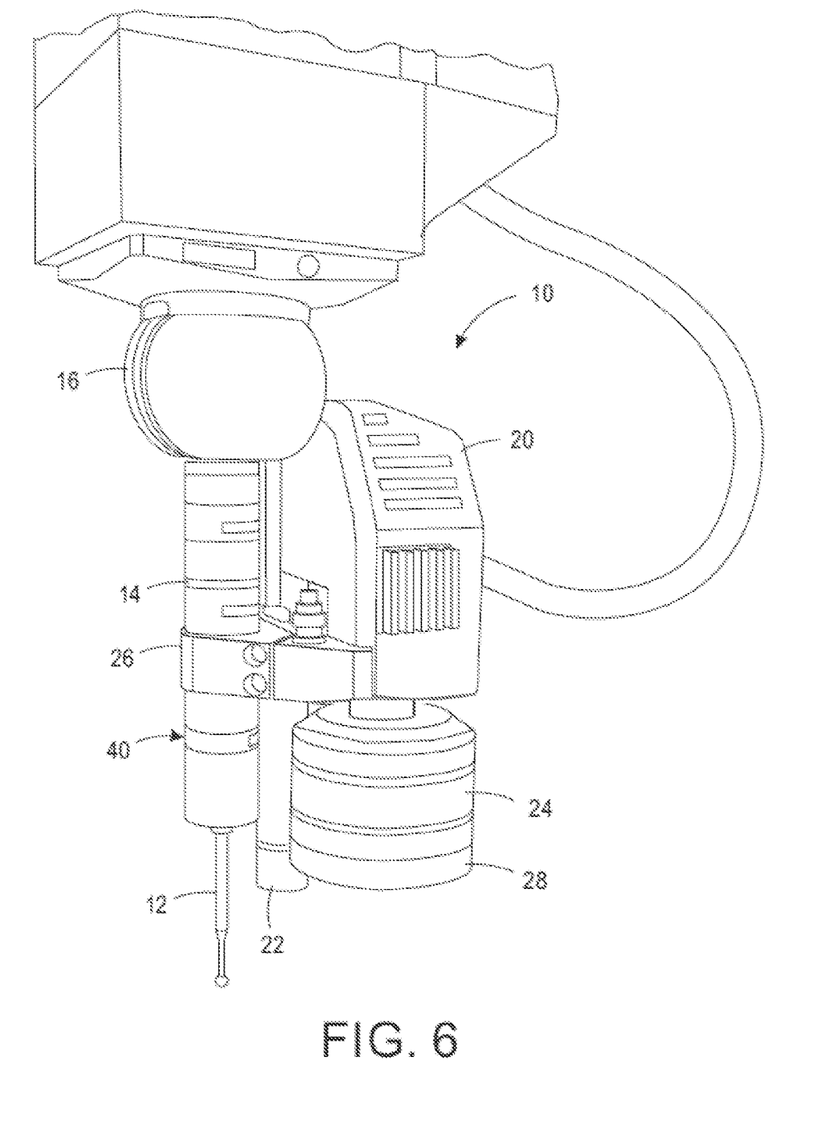
FIG. 6 is a another perspective view of the same articulated sensor head.

A featured embodiment of an articulated sensor head 10 as shown in the drawing figures includes a first sensor module 12 in the form of a touch probe stylus carried on an extended shank 14. An articulating wrist 16, which can be supported from a measurement axis of a coordinate measuring machine, connects one end of the extended shank 14 to a pivot axis 18. The depicted articulating wrist 16 preferably includes a motorized assembly for pivoting the shank 14 about the pivot axis 18 through a limited range of angular travel as referenced between different orientations of the shank 14 shown in FIGS. 1 and 4. A second motorized assembly of the articulating wrist can be provided for rotating the shank 14 about a vertical axis aligned with the extended shank 14 in the articulated position shown in FIGS. 1-3. The coordinate measuring machine can provide additional relative translational and rotational motions of the articulated sensor head 10 with respect to a test object 30 by moving one or both of the articulated sensor head 10 and the test object 30. The articulating wrist 16 and extended shank 14 can be fashioned as a Renishaw PH10MQ motorized probe head from Renishaw Inc. of 5277 Trillium Blvd., Hoffman Estates, Ill. 60192.

A housing 20, which is attached to the extended shank 14 carries both a second sensor module 22 in the form of a depth-sensing laser and a third sensor module 24 in the form of a vision sensor. The housing 20 is shown in at least FIGS. 1-6 attached to the shank 14 by a removable clamp 26. The second sensor module 22 as a depth-sensing laser can be compact interferometer laser sensor using a narrow range of beam frequencies to measure distances to the test object based on the rate of interferometric phase variations with beam frequency. The third sensor module 24 as a vision sensor can include a Basler acA2500-14gm, 5-MP digital camera with a multi-sector, green LED ring light 28 and a bandpass filter (500-550 nm) in front of the camera to reduce the sensitivity of the camera to ambient light. The referenced camera is available from Basler, Inc., Exton, 855 Springdale Drive, Suite 203, Exton, Pa. 19341.

Each of the sensor modules includes a measurement axis, which contributes to defining a central measurement position along the measurement axis of each sensor, i.e., as a measurement position recognized as lying within a common coordinate system. The first sensor module 12 as a touch probe stylus 12 has a measurement axis 32 that extends through the probe tip. The second sensor module 22 as a depth-sensing laser has a measurement axis 34 that extends along an optical axis of its emitted laser beam. The third sensor module 24 as a vision sensor has a measurement axis 36 that extends along an optical axis of its objective imaging optics. The ring light 28 is positioned co-axial with the measurement axis 36.

The second sensor module 22 and the third sensor module 24 are mounted within the housing 20 so that their measurement axes 34 and 36 are maintained in a fixed angular orientation with respect to the measurement axis 32 of the first sensor module 12 throughout the range of articulation about the pivot axis 18 of the articulating wrist 16. Preferably, the fixed angular orientation of the measurement axes 34 and 36 is held within 20 degrees of the measurement axis 32. More preferably as shown, the measurement axes 32, 34, and 36 all extend in parallel. The fixed offset relationships among the measurement axes 32, 34, and 36 including their respective measurement positions along their measurement axes can be calibrated with displacements of the articulated sensor head 10 so that the same point on the test object 30 can be quickly measured by any one of the three sensor modules. The required displacements of the articulated sensor head 10 can be effected by one or more motion axes of the coordinate measuring machine or another motion axis through the articulated sensor head while accounting for any angular displacements of the articulated sensor head 10. Thus, the same location on the test object 30 can be readily measured by each of the three sensor modules, which provide different types of measurements without requiring any of the sensor modules to be replaced or moved out of proximity with the test object 30.

To provide additional flexibility for measuring test objects in different ways, the first sensor module is preferably interchangeable with alternative sensor modules. For example, a first coupling 40 having a coupling member 42 attached to the free end of the shank 14 and a mating coupling member 44 attached the first sensor module 12 allows the first sensor module 12 to be exchanged with alternative sensor modules having a similar mating coupling member independently of the second and third sensor modules. The alternative sensor modules, which can be different touch probe styluses or sensor modules for carrying out different types of measurements, can be stored in a docking station that is within the travel range of the coordinate measurement machine for carrying out automated exchanges in a known manner.

The second and third sensor modules can be collectively attached or detached from the extended shank 14 via the removable clamp 26, which can be clamped to an intermediate portion of the extended shank 14 by tightening the clamp 26 or released from the intermediate portion of the shank 14 by loosening the clamp 26. Once the housing 20 is detached, measurements can be taken by the first sensor module 12 without carrying the weight or bulk of the housing 20. Alternatively, another housing carrying one or more different sensor modules can be clamped or otherwise releasably fastened to the shank for taking additional measurements. In an alternative housing, the second sensor module 22 can be another depth-sensing laser further adapted to a desired measurement and a third sensor module 24 can be another a vision sensor further adapted to a desired measurement, or either or both of the second and third sensor modules can be arranged for taking different types of measurements.

A similar coupling 48 within the housing 20 can be arranged to allow the second sensor module 22 to be replaced by a similarly coupleable alternative sensor module independently of the first and third sensor modules. A docking station within the range of travel of the coordinate measuring machine can be arranged to hold one or more alternative second sensor modules to support the automated exchange of the second sensor modules. One or more alternative housings can also be stored in a docking station positioned for convenient replacement of the housing 20. In a manner similar to the first coupling 40, the coupling 48 can include a coupling member attached to the housing and a mating coupling member attached second sensor module 22. Alternative sensor modules having a similar mating coupling member can be exchanged with the second sensor module independently of the first and third sensor modules.

To allow a full range or at least a desired range of motion about the pivot axis 18, the housing 20 is preferably attached along the intermediate portion of the extended shank 14 at a displacement D from the pivot axis 18 that avoids interference between the housing 20 and the articulating wrist 16 or its connection to the coordinate measuring machine. For example, with respect to the referenced Renishaw PH10MQ motorized probe head, the housing is preferably clamped at a distance of approximately 65 mm or more from the probe axis 18.

For measuring the test object 30 with the articulated sensor head 10, reference measurement positions of each of the three sensor modules 12, 22, and 24 are calibrated with respect to each other as relative displacements of the articulated sensor head 10. A first measurement is taken of a given point on the test object 30 with a first of the three sensor modules 12, 22, and 24. The given point can be one of a plurality of points captured by the first-referenced sensor module. For taking a second measurement of the test object 30 with a second of the three sensor modules 12, 22, and 24 at the given point on the test object 30, the articulated sensor head 10 is displaced by the calibrated amount of displacement between the reference measurement positions between the first-referenced and second-referenced sensor modules. For taking a third measurement of the test object 30 with a third of the three sensor modules 12, 22, and 24 at the given point on the test object 30, the articulated sensor head 10 is displaced by the calibrated amount of displacement between the reference measurement positions of the second-referenced and third-referenced sensor modules. By arranging the respective measurement axes 32, 34, and 36 of the three sensor modules 12, 22, and 24 in parallel, the calibrated displacements can be simplified and carried out by translations of the articulated sensor head 10. The referenced measurement positions can be calibrated by measuring a common test feature in a given orientation with each of the three sensor modules and recording the relative displacements between the sensor modules required for the collective points measured by the sensor modules to correspond within a common coordinate system within notable ranges of tolerances associated with the repeatability of the measurements.

Figure 7:
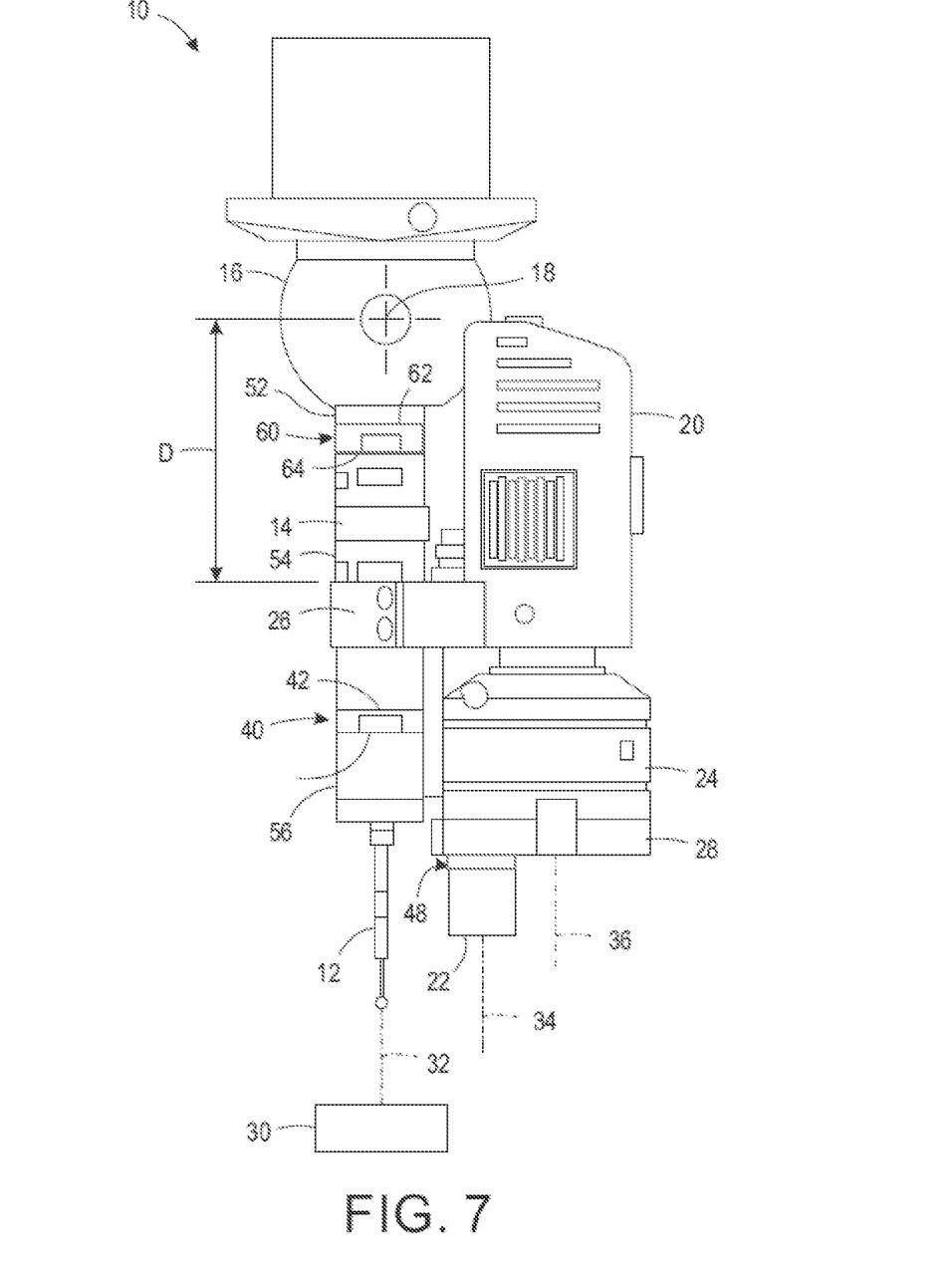
FIG. 7 is a side view of a similar articulated sensor head featuring a coupling along an extended shank for releasably attaching a housing carrying sensor modules to the extended shank.
Figure 8:
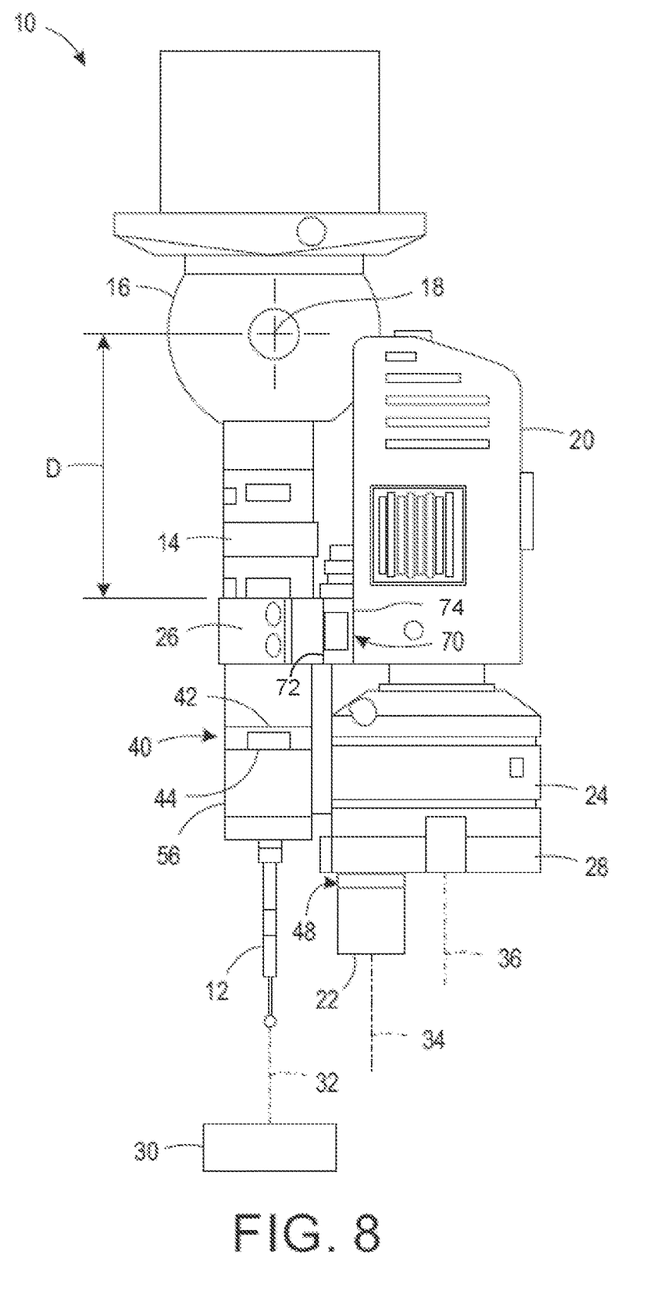
FIG. 8 is a side view of a similar articulated sensor head featuring a coupling located between the extended shank and the housing for releasably attaching the housing carrying sensor modules to the extended shank.

FIGS. 7 and 8 feature alternative ways of attaching the housing 20 carrying the second and third sensor modules 22 and 24 to the extended shank 14. In FIG. 7, the housing 20 is fixed (e.g., clamped) to an intermediate section 54 of the extended shank 14. For example, the clamp 26 can be either removable or permanently fixed to the intermediate section 54 of the extended shank 14 for purposes of convenience beyond the need for replacing the housing 20 with another housing. Instead, the intermediate section 54 of the extended shank 14 is coupled to an upper section 52 of the extended shank 14 through a coupling 60 and is coupled to a lower section 56 of the extended shank through the coupling 40. The upper section 52 of the extended shank 14 is connected to the articulating wrist 16, and the lower section 56 of the extended shank is part of the first sensor module 12. The coupling 60, which is similar to the coupling 40, includes a coupling member 62 attached to the upper section 52 of the extended shank 14 and a mating coupling member 64 attached intermediate section 54 of the extended shank 14. While decoupling the coupling 60 detaches both the first sensor module 12 and the housing 30 carrying the second and third sensor modules 22 and 24 from the upper section 52 of the extended shank 14, the housing 20 can be replaced by a different housing carrying different second or third sensor modules fixed to a similar intermediate section without replacing the first sensor module 12. That is, the replacement intermediate section with the different fixed housing can be coupled to the upper section 52 of the extended shaft 14, and the original lower section 56 of the extended shaft 14 as a part of the first sensor module 12 can be coupled to the replacement intermediate section. To allow for the first sensor module 12 to be operated without the weight and bulk of the housing 20 carrying the second and third sensor modules 22 and 24, a replacement intermediate section can be provided, which is not fixed to such a housing.

In FIG. 8, the housing 20 is coupled to the intermediate portion of the extended shank 14 through a coupling 70 located between the housing 20 and the clamp 26. Once again, the clamp 26 can be either removable or permanently fixed to the intermediate portion of the extended shank 14 for purposes of convenience beyond the need for replacing the housing 20 with another housing. The coupling 70, which can also be similar to the coupling 40, includes a coupling member 72 attached to the clamp 26 and a mating coupling member 74 attached to the housing 20. The housing 20 together with the second and third sensor modules 22 and 24 can be attached or detached from the extended shank 14 via the coupling 70. One coupling member 72 of the coupling 70 is attached to the clamp 26 and a mating coupling member 74 is attached to the housing 20. Once the housing 20 is detached, measurements can be taken by the first sensor module 12 without carrying the weight or bulk of the housing 20. Alternatively, another housing carrying one or more different sensor modules and having a similar mating coupling member can be coupled to the extended shank 14 through the coupling member 72 attached to the clamp 26 for taking additional measurements.

Preferably, the couplings 40, 48, 60, and 70 are kinematic couplings whereby the individual sensor modules or housings can be coupled and recoupled while maintaining precision and certainty of location to minimize requirements for recalibration. The light sources used with the vision sensors can be arranged to provide the type of lighting required for the desired vision measurement including directing light within desired wavelength bands over desired ranges of incidence angles and appropriately sized areas at the desired working distance.

Figure 9:
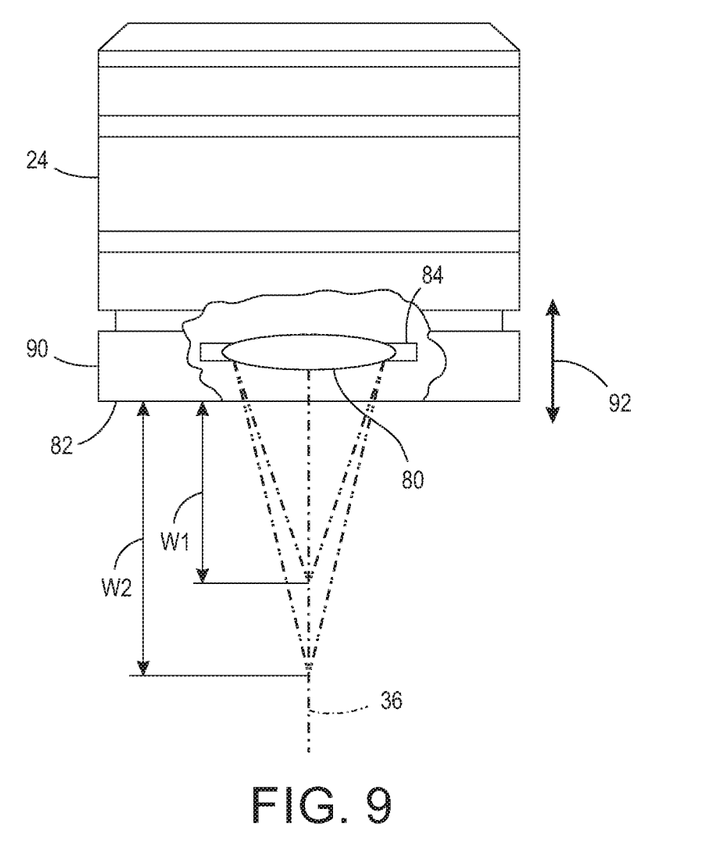
FIG. 9 is a side view of a vision sensor of a type that can be carried in the housing including a broken out section showing a variable focal length lens.

The third sensor module 24 as a part of a vision sensor is depicted in FIG. 9 with a variable focal length lens 80 for adjusting a working distance between an end face 82 of the sensor module 24 and the focal plane of the variable focal length lens 80. For example, a first working distance W1 is depicted for one focal length and a second working distance W2 is depicted for a second focal distance. While variable focal length lenses can be constructed in a variety of known ways, the variable focal length lens 80 is depicted with electrodes 84 whose voltages can be controlled to change the shape of an electro-reactive fluid filled lens.

To accommodate the variable working distances, e.g., W1 and W2, effected by the variable focal length lens 80, the third sensor module 24 can also include an adjustable light source 90, which can be adjusted to maintain desired ranges of incidence angles and appropriately sized areas at the desired working distance. The adjustable light source 90 can be adjusted by a linear actuator depicted as the arrow 92 to translate the light source 90 along the measurement axis 36 in accordance with the changes in working distance along the same axis. Alternatively, the angular orientations of light beams emitted by the light source can be angularly adjusted with respect to the measurement axis to illuminate the desired area on a test part at the different working distances. Variable lighting patterns at different transverse diameters or aperture sizes could also be used.

While the above description references certain embodiments in detail, it will be understood that variants of these embodiments and other features and functions and alternatives thereof may be combined into may other different systems or applications. As such, various presently unforeseen or unanticipated alternatives, modifications, variations or improvements therein may be subsequently made by those skilled in the art, which are also intended to be encompassed by the following claims.

The invention claimed is:

1. An articulated sensor head comprising:
    a first sensor module carried on an extended shank that is mounted in a pivotable fashion from an articulating wrist;
    a housing carrying second and third sensor modules fastened to the extended shank;
    the second and third sensor modules being carried by the housing in a fixed angular orientation with respect to an orientation of the first sensor module; and
    the first, second, and third sensor modules being arranged for collecting information about test objects in different ways,
    wherein the first sensor module is a part of a touch probe that collects information from relative physical displacements of a stylus with respect to a test object, the second sensor module is part of a depth-sensing laser that collects information from laser beam reflections from the test object, and the third sensor module is a part of a vision sensor that collects information from camera images taken of the test object.

2. The articulated sensor head of claim 1 in which the vision sensor includes a co-axial light source.

3. The articulated sensor head of claim 1 in which each of the three sensor modules has a reference measurement position that is calibrated with respect to the reference measurement positions of the other sensor modules by displacements of the articulated sensor head.

4. The articulated sensor head of claim 1 in which each of the three sensor modules includes a measurement axis, and the measurement axes of the second and third sensor modules share a common fixed angular orientation in a predetermined angular relationship with the measurement axis of the first sensor module.

5. The articulated sensor head of claim 4 in which the measurement axes of all three sensor modules extend in parallel.

6. An articulated sensor head comprising:
    a first sensor module carried on an extended shank that is mounted in a pivotable fashion from an articulating wrist;
    a housing carrying second and third sensor modules fastened to the extended shank; and
    the second and third sensor modules being carried by the housing in a fixed angular orientation with respect to an orientation of the first sensor module,
    wherein the second and third sensor modules are collectively attachable and detachable from an intermediate portion of the extended shank independently of the first sensor module using a releasable fastening device between the housing and the extended shank.

7. The articulated sensor head of claim 6 further comprising a first coupling for releasably connecting the first sensor module to the extended shank so that the first sensor module is exchangeable with a similarly coupleable alternative sensor module independently of the second and third sensor modules.

8. The articulated sensor head of claim 7 further comprising a second coupling for releasably connecting the second sensor module to the housing so that the second sensor module is interchangeable with a similarly coupleable alternative sensor module.

9. The articulated sensor head of claim 7 in which the releasable fastening device includes a second coupling for releasably connecting the housing carrying the second and third sensor modules to the intermediate portion of the extended shank so that the housing is interchangeable with a similarly coupleable alternative housing without disconnecting the first sensor module from the extended shank.

10. An articulated sensor head comprising:
a first sensor module carried on an extended shank that is mounted in a pivotable fashion from an articulating wrist;
a housing carrying second and third sensor modules fastened to the extended shank; and
the second and third sensor modules being carried by the housing in a fixed angular orientation with respect to an orientation of the first sensor module,
wherein the extended shank includes a length with a first releasable coupling along a first portion of the length of the extended shank for releasably connecting the first sensor module to the extended shank and a second releasable coupling along a second portion of the length of the extended shank for releasably connecting the housing carrying the second and third sensor modules to the extended shank.

11. The articulated sensor head of claim 10 in which the housing carrying the second and third sensor modules is fixed to a third portion of the length of the extended shank between the first and second portions of the extended shank.

* * * * *